United States Patent [19]

Gaynor et al.

[11] 3,733,485
[45] May 15, 1973

[54] EXPOSURE METER FOR THERMAL IMAGING DEVICES

[75] Inventors: Joseph Gaynor, Arcadia; Terry G. Anderson, Pasadena, both of Calif.

[73] Assignee: Bell & Howell Company, Pasadena, Calif.

[22] Filed: Mar. 18, 1971

[21] Appl. No.: 125,684

[52] U.S. Cl. .................................................. 250/65 T
[51] Int. Cl. .................................................. B41m 5/00
[58] Field of Search ......................... 250/65 T, 214 P; 350/160 P

[56] References Cited

UNITED STATES PATENTS

| | | | |
|---|---|---|---|
| 3,513,308 | 5/1970 | Tajima et al. | 250/65 T |
| 3,569,709 | 3/1971 | Wank | 250/183.3 |
| 3,219,993 | 11/1965 | Schwerz | 350/160 P |
| 3,439,525 | 4/1969 | Watermann et al. | 73/15.4 |
| 3,117,490 | 1/1964 | Byrd | 250/214 P |
| 3,114,836 | 12/1963 | Fergason | 250/83 |
| 2,952,780 | 9/1960 | Rogers | 250/214 P |

*Primary Examiner*—James W. Lawrence
*Assistant Examiner*—C. E. Church
*Attorney*—Nilsson, Robbins, Wills & Berliner

[57] ABSTRACT

An exposure meter to permit the determination of optimum thermal exposure of a document to be thermographically reproduced. A sheet of thermotropic material is assembled with the document and exposed to thermal radiation until a change in form is discerned corresponding to the document information. Exemplary thermotropic materials include cholesteric liquid crystalline material, thermochromic compounds, heat-fusible materials and materials having electrical resistance which is sharply temperature dependent.

12 Claims, 7 Drawing Figures

PATENTED MAY 15 1973
3,733,485
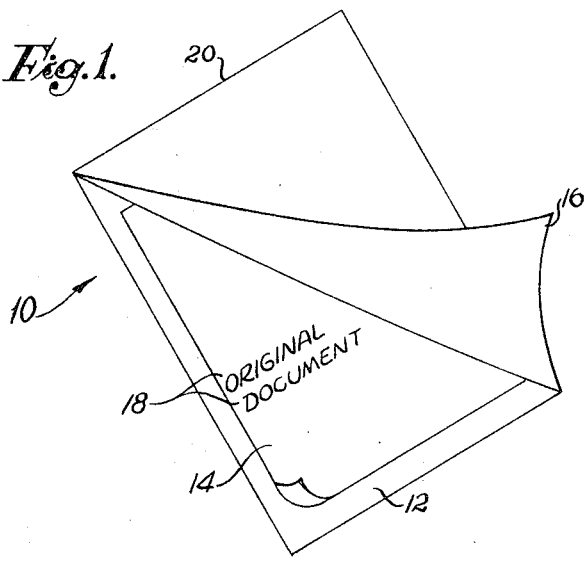
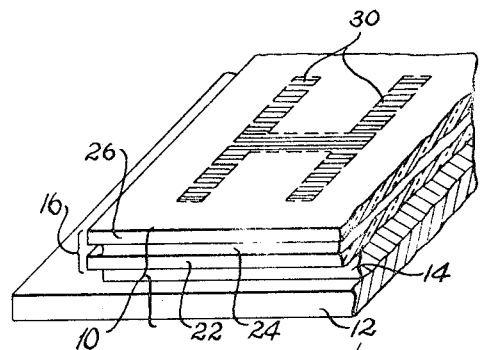
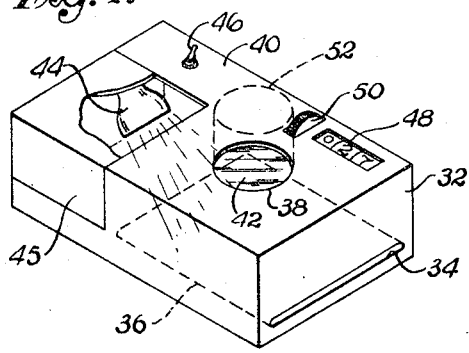
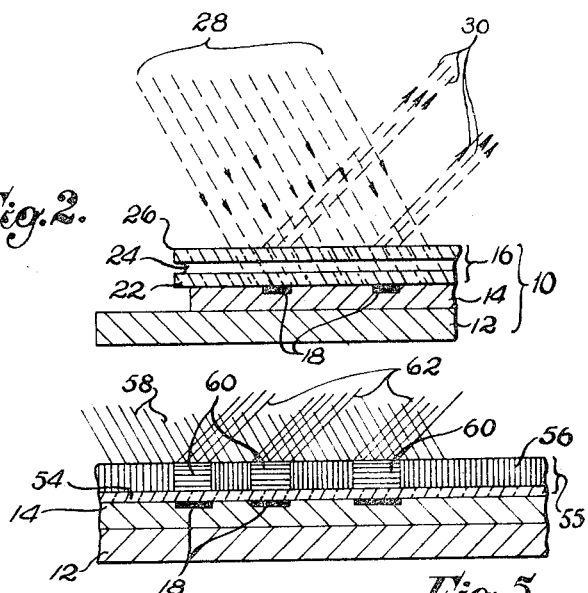
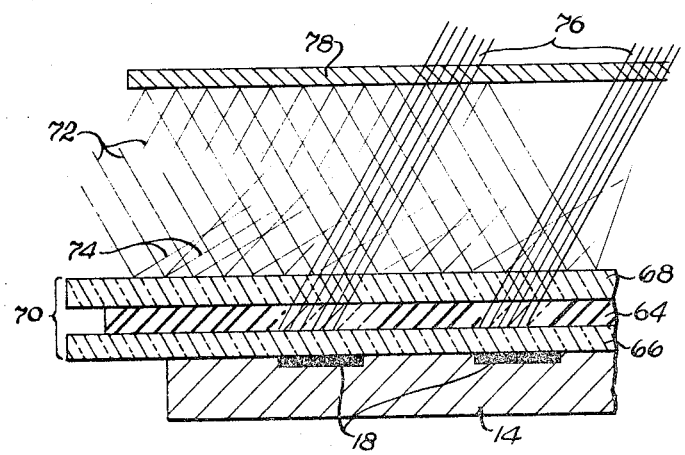
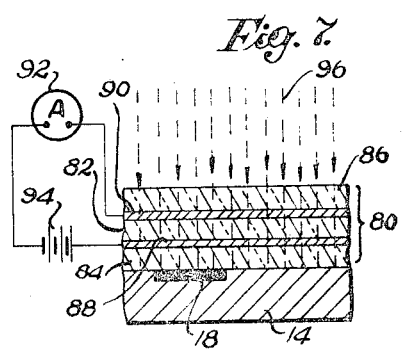
INVENTORS.
JOSEPH GAYNOR
TERRY G. ANDERSON
BY
NILSSON, ROBBINS, WILLS & BERLINER
ATTORNEYS

EXPOSURE METER FOR THERMAL IMAGING DEVICES

FIELD OF THE INVENTION

The fields of art to which the invention pertains include the fields of thermographic and thermochemical recorders and measuring and testing devices, including thermometers based on color change, fusion and electrical resistance.

BACKGROUND AND SUMMARY OF THE INVENTION

Thermal methods for copying documents make use of image-wise temperature variations which bring about local chemical or physical changes in suitable media. The information on an original document is reproduced in a material which can be either the final product or an intermediate master for use in a second process to make multiple copies. In the modern version of such processes a thermal image, produced by image-wise absorption of infrared radiation, is used to melt selective portions of a dye-wax layer which are then transferred to the receiving surface of a master sheet. In other thermal processes, the receiving sheet serves as the final copy.

One of the problems associated with such thermographic reproduction methods is determining the amount of infrared radiation required by a particular document in order to produce a temperature change in the copy medium which results in the highest quality image production. Optimum exposure depends on a variety of parameters relating to the equipment and transfer material utilized as well as the properties of the document to be reproduced. The properties of the equipment and transfer material are relatively constant and predictable, but the radiation absorption and heat transfer properties of the document to be reproduced may vary over a wide range. Even an experienced user may need to make several copies before an optimum one is produced. The problem is compounded when making a master for multiple reproduction. It is often not possible to judge the copy quality which will be produced by non-magnified visual examination of the transferred dye-wax master. Such difficulties tend to limit the use and sale of thermal imaging devices.

The present invention provides a facile method for determining the proper thermal exposure for thermographically reproducing an original document. A meter is provided which monitors the temperature rise produced as a result of thermal exposure of the original document. The temperature rise can be correlated with the temperature rise known to produce an optimum thermographic master or copy. The meter comprises a sheet of material which undergoes a discernible and reversible change in form at a predetermined temperature. Such materials can be called "thermotropic" since the change in form is a result of heating to a particular temperature. The sheet of thermotropic material is positioned adjacent a document containing information to be reproduced. The document is exposed to radiation sufficient to generate a heat pattern in correspondence with the information to be produced and the heat pattern causes a desired change in the thermotropic material. The level of heat exposure required to cause such change can be correlated with the level of heat exposure for optimum thermographic reproduction from that document. Thereafter, the document is thermographically reproduced utilizing an exposure setting obtained from such correlation.

Broadly, any thermotropic material having a temperature dependent form which is discernible can be utilized with an appropriate detection or monitoring arrangement. The process is particularly useful with materials known as cholesteric liquid crystals. The wavelength of maximum reflection of incident radiation from such materials is highly temperature dependent. Other materials which can be used are thermochromic compounds which change color reversibly when heated to a given temperature, materials which fuse to become transparent when molten but which scatter light when solid, and materials which exhibit a sharp decrease in electrical resistance at known temperatures.

BRIEF DESCRIPTION OF THE DRAWINGS

FIG. 1 is a schematic, perspective view of an assembly including a sheet of cholesteric liquid crystalline material and an original document in accordance with an embodiment of the present invention;

FIG. 2 is a schematic representation in cross-section of the assembly of FIG. 1, during a combination of illumination and infrared exposure;

FIG. 3 illustrates the appearance of an image obtained as a result of the exposure of FIG. 2;

FIG. 4 is a schematic, perspective view of a thermal exposure meter utilizing the assembly of FIG. 1;

FIG. 5 is a schematic representation in cross-section of an assembly including an original document and a sheet of thermochromic material, during combined illumination and infrared exposure;

FIG. 6 is a schematic representation in cross-section of an assembly of an original document and a sheet of heat-fusible material, during combined illumination and infrared exposure; and FIG. 7 is a schematic representation in cross-section of an assembly of an original document and a sheet of material with thermodependent electrical resistance during infrared exposure.

DETAILED DESCRIPTION

Referring to FIG. 1, an assembly 10 is illustrated which includes a base sheet 12 of relatively thick paper supporting an original document 14 and a sheet 16 of thermotropic material. In this illustration, the sheet 16 includes a layer of cholesteric liquid crystalline material, as hereinafter described in more detail. The original document 14 contains infrared-absorptive indicia 18 on its face and is placed face-up on the base sheet 12 beneath the thermotropic sheet 16. The top edge of the thermotropic sheet 16 is secured by adhesive or the like to the top edge 20 of the base sheet 12 so as to provide an easily manipulated assembly.

Referring additionally to FIG. 2, the assembly 10 is processed to determine the optimum level of heat exposure to which to subject the original document 14 during thermographic duplication. The original document 14 is placed on the supporting base sheet 12 with its infrared-absorptive indicia 18 facing upwardly. The indicia 18 are constituted of carbon, heavy metal or any material which upon exposure to infrared will absorb more infrared radiation than the surrounding non-image areas, so as to convert the absorbed energy to a thermal pattern corresponding to the visible image pattern on the document 14.

The thermotropic sheet 16 is formed with a substrate 22 sufficiently thin, about ½–2 mils thick, about the same thickness as the simulated substrate, to avoid significant attenuation of the conducted heat pattern, and which has sufficient thermal durability so as to retain mechanical strength during exposure. Mylar, a transparent, polyethylene terephthalate polyester film, can be used. The substrate 22 is coated with a thin layer 24, also about ½–2 mils thick, of cholesteric liquid crystalline material, simulating the thickness of a thermographic layer so that the total thickness results in the same heat transport rate as the thermal imaging material. In this case, the cholesteric liquid crystalline material is a mixture, by weight, of about 5 percent cholesteryl nonanoate 50 percent cholesteryl chloride and 45 percent oleyl cholesteryl carbonate. This material has a cholesteric-isotropic transition temperature of about 33° C and the mixture remains in liquid crystalline form at room temperature. When heated above room temperature, the material undergoes a color play, visible against a black background, from red to violet over a temperature range of 33°–35° C.

In this example, another sheet 26 of Mylar, about 2 mils thick, is provided to protect the layer of liquid crystalline material 24 from contamination. The sandwiched assembly of Mylar layers 22 and 26 and liquid crystalline material 24 constitutes the thermotropic sheet 16. The assembly of base sheet 12, document thermotropic and sheet 16 is sandwiched together so that directly opposing surfaces are contiguous with one another. The assembly 10 is then exposed to radiation 28 which is rich in infrared rays and which contains substantial amounts of visible light. The radiation 28 is directed onto the sheet 16 so as to penetrate the sheet 16 and impinge onto the original document 14. The infrared portions of the radiation 28 generate a temperature rise in the indicia 18 portions of the document 14, resulting in a thermal pattern emanating from the document 14 which selectively raises the temperature of the sheet 16 in regions corresponding to the indicia 18.

The nature of cholesteric liquid crystalline material is such that a full spectrum of wavelengths are reflected over the color play temperature range. With the particular mixture exemplified, red light is initially reflected at 33° C and reflection progresses through the spectrum to blue light and then violet light at 35° C. Exposure radiation 28 can be utilized containing visible light including all of the wavelengths of the visible spectrum and one can simply look for a color play to determine the fact that a temperature range of 33°–35° C has been reached. On the other hand, if more accuracy is desired, one can look for only those wavelengths which represent a specific temperature, for example, red light to indicate that 33° C has been reached. Alternatively, one can utilize radiation 28 which contains only infrared wavelengths and the wavelengths of a color which represents a particular temperature desired. In such case, reflection is observed only when that particular temperature is reached. Either method is useful for the present purpose.

The method of exposure illustrated in FIG. 2 utilizes radiation 28 in which infrared wavelengths are mixed with wavelengths of red light. As the sheet 16 is progressively exposed to the radiation 28, the temperature of selected portions is raised in accordance with the heat pattern generated by the indicia 18. Upon reaching the predetermined temperature of 33°C, an image is observed as a result of reflection of wavelengths 30 of red light, thereby signaling a temperature of 33° C.

Referring to FIG. 3, there is illustrated a portion of the top surface of the sheet 16 following the thermal exposure step of FIG. 2, wherein the image 30 corresponding to the indicia 18 is seen as a reflection pattern from the surface of the liquid crystalline layer 24.

The time required from initial exposure to discernment of the reflected image is measured and recorded. This time in conjunction with the known and constant intensity of the infrared radiation and spatial relationship between the infrared source and surface of the thermotropic sheet 16 can be correlated with the exposure required in any particular instrument for optimum thermographic reproduction from that document 14. For example, thermographic exposure of the original document to produce a spirit process master can be made on an exposure and printing unit sold by Bell & Howell Company under the trademark "Ditto Combomatic." Exposure settings on this machine run from a high exposure of 1 to a low exposure of 10. Using the thermotropic sheet 16, optimum exposure settings for documents of varying densities can be determined and correlated with the time required for exposure. Accordingly, having taken a new original document 14 and exposed it in accordance with the method illustrated in FIG. 2, the length of time necessary for an image 30 to be discerned can be translated into an appropriate exposure setting on the scale 1 to 10 for the Ditto Combomatic machine.

The optical properties of the cholesteric material cause reflection as if from parallel planes. Accordingly, the wavelengths of the observed light depends on the angle of incidence and reflection. These angles can be readily held fixed in a viewing apparatus. Referring to FIG. 4, such an apparatus is illustrated and includes a housing 32 having a slot 34 in side wall thereof leading to an exposure chamber. The floor 36 of the exposure chamber supports the sandwiched assembly 10 beneath a viewing port 38 in a top wall 40. A magnifying lens 42 can be disposed in the viewing port to magnify the document enabling better visual inspection. Illumination and infrared exposure are provided by an appropriate lamp 44 in an adjacent portion of the housing 32 behind an access panel 45. As light from the lamp 44 is reflected from the assembly 10, changes are observed through the port lens 42. An on-off switch 46 controls both the lamp 44 and interval timer 48, which has a reset wheel 50. An automated device can be similarly constructed except that the observation port 38 would be replaced by a suitable sensor, shown in shadow at 52, and associated electronics. Furthermore, a color filter can be incorporated with the port lens 42 and full spectrum lamp 44 utilized. A device such as illustrated in FIG. 4 may be provided as an integral part of a thermal copier or may be supplied as an independent piece of equipment as need, cost and application requirements dictate.

Liquid crystals are well known to the prior art. See, for example, the articles by J.L. Fergason, Scientific American, Volume 211, No. 2, pages 77–86 (1964); by G.H. Brown, Industrial Research, May, 1966, pages 53–59; by M. Lauriente and J.L. Fergason, Electronic Design, Volume 19, pages 71–79, Sept. 13, 1967; by J.L. Fergason, Applied Optics, Volume 7, No. 9, pages 1,729–1,737, September, 1968. Briefly, such materials are substances which, under certain conditions, simultaneously exhibit the fluid properties of liquids and the optical properties associated with crystalline order. Cholesteric liquid crystals are derivatives of cholesterol which have the property of reflecting different colors with temperature changes. Although most cholesteric substances are colorless as isotropic liquids, they pass through a series of bright colors when they are cooled through their liquid-crystal phase. In this phase they may first appear to be violet, then blue, then green, then red, and finally colorless again as the reflection maximum enters the infrared region. Importantly, at a certain temperature a given material or combination of materials will always exhibit the same color so that when reheated, the reverse color play will occur. The rate of change from color to color as well as the exact temperature at which specific color changes occur are reproducible.

The apparent color of a cholesteric liquid layer is due not to absorption but to selective reflection of a narrow wavelength band of incident light. The wavelength of maximum reflection is a function of internal structure parameters which, in turn, depend on the temperature. The observable result is that a temperature change on the order of 1° C can be enough to shift the color of the liquid crystal from the red end of the visible spectrum to the blue. The color changes are repeatable and the active temperature range can be preselected. Only a thin layer (for example 0.001 inch) of the material is required and the heat capacity of the liquid (typically 0.35 cal.g$^{-1}$ deg$^{-1}$) is sufficiently small to enable fast response. The resolution limit imposed by the cholesteric liquid is in excess of 17 line pairs per millimeter, well in excess of the requirements for typical thermographic reproduction. In the present embodiment, cholesteric liquid crystalline materials exhibiting a color play in the temperature region of about 35° to about 40° C, and coated with a thickness of about 1 to about 2 mils, are generally useful.

A wide variety of cholesteric liquid crystalline materials are available and representative classes are cholesteryl esters and cholesteryl halides. Specific examples include cholesteryl benzoate, cholesteryl chloride, cholesteryl nonanoate, cholesteryl oleate, cholesteryl oleyl carbonate, cholesteryl iodide, 2,4-dichlorocho-lesteryl benzoate, and the like, and mixtures thereof. It is well known to react cholesterol with other molecules to produce a large variety of compounds. In particular, the OH group of cholesterol can be reacted with an acid, such as an organic acid to form cholesterates. Most of the compounds in this group form a cholesteric liquid phase. It is also known to incorporate oil soluble materials which are not liquid crystalline. A dye may be added to a cholesteric liquid crystalline material to change its absorption characteristics for visible light and still retain a liquid crystal phase. Furthermore, cholesteric substances can be mixed in various proportions, allowing an almost unlimited variety of materials that change color at almost any temperature.

The cholesteric material can be coated from a chloroform solution onto the Mylar substrate 22. Alternatively, the cholesteric material can be placed in liquid form along one edge of the Mylar substrate 22 and the cover Mylar sheet 26 placed thereon. The sandwich can then be squeezed between rollers to spread the cholesteric material as the layer 24 evenly. In place of the Mylar substrate, one can utilize any infrared translucent material, such as glass, rigid plastic, and the like.

It is also known to encapsulate liquid crystalline material in spheres approximately 40 – 50 microns in diameter. The encapsulated material can be used in the same manner as the pure material. Such beads represent discrete elements and thus resolution is slightly degraded. However, the intensity of light scattered from an encapsulated material is less dependent upon the angle of illumination than is the light scattered from smooth films of cholesteric liquid.

Referring now to FIG. 5, there is illustrated an alternative embodiment wherein a thermochromic compound is utilized to measure the level of proper thermal exposure. As in the embodiment illustrated in FIG. 2, the original document 14 is placed on the supporting base sheet 12 with its infrared-absorptive indicia 18 facing upwardly. In place of the sheet of cholesteric liquid crystalline material, the thermotropic sheet utilized in this embodiment is constituted of a substrate 54 of Mylar or other transparent material, coated with a layer 56 of thermochromic material. The layer 56 contains a thermochromic compound uniformly dispersed in a binder of wax or polymer, such as paraffin, polyethylene or polystyrene to form a smooth continuous film on the substrate 54. Although not specifically shown in the drawings, one may contact the image directly with the thermochromic material to obtain better resolution.

Thermochromic compounds are compounds which change color reversibly when heated to a given temperature. For example, the following compounds can be utilized, which change color in accordance with the following table.

TABLE I

| Compound | Color Change | Temperature |
|---|---|---|
| $Ag_2HgI_4$ (silver mercuric iodide) | Yellow to bright Orange | 50.5°C |
| $Cu_2HgI_4$ (copper mercuric iodide) | Red to Black | 69°C |
| $Cu_2Hg_{0.75}Cd_{0.25}I_4$ | Red to Black | 80°–90°C |
| Tetrakis (dimethylamino)ethylene-nitrobenzene charge transfer complex | White to Magenta | Melting point of binder |

In a specific embodiment, 50 parts by weight of $Cu_2HgI_4$ is dispersed in a polystyrene solution and coated on the Mylar substrate 54 to a thickness of about 3 mils to constitute a thermotropic sheet 55. The thermochromic layer 56 is originally a red color and when heated to a temperature of 69° C it turns sharply to black. As illustrated in FIG. 5, the sheet 55 is placed atop the document 14 and the assembly is exposed to radiation 58 rich in infrared rays and also containing, as an indicator, wavelengths corresponding to red light. The red light wavelengths are reflected by the thermochromic layer 56 until a temperature of 69° C is reached in image portions 60 corresponding to the document indicia 18. At that point, the image portions 60 absorb the red light wavelengths, as indicated at 62. Alternatively, the radiation 58 can include wavelengths of the entire color spectrum in which case the "end point" is determined by noting the development of a color contrast.

Referring to FIG. 6, another embodiment is illustrated in which a layer of heat fusible material 64 is sandwiched between substrates 66 and 68 of Mylar or the like to form a thermotropic sheet 70. The dimensions of the layers 64, 66 and 68 correspond to that of the layers 24, 22 and 26, respectively, of FIG. 2. The heat fusible material can be low molecular weight polyethylene, microcrystalline wax, ethylene-propylene copolymers, paraffin wax, or the like, or mixtures thereof. The sheet 70 is placed on a document 14 containing indicia 18 to be duplicated and exposed to radiation 72 rich in infrared and containing wavelengths of visible light. The visible light radiation is scattered in all directions as indicated at 74 as a result of impingement onto the solid, opaque material 64. However, as the fusion point is reached in those areas which have been heated sufficiently to become molten, the light is reflected, as at 76, from the surface of the lower Mylar substrate 66. A polarizing filter 78 is placed above the assembly and transmits substantially only that light 76 reflected from the Mylar substrate 66, corresponding to the image pattern. The "end point" of the exposure can be readily determined by observing image formation through the polarizing filter 78.

Referring to FIG. 7, still another embodiment of the invention is illustrated wherein a thermotropic sheet 80 is formed with a layer 82 having an electrical resistance value which is sharply temperature dependent so as to exhibit a marked decrease in electrical resistance at a predetermined temperature. In accordance with this embodiment, electrical resistance can be considered as being sharply temperature dependent when a change in 1°–3° C at the "end point" results in a sharp decrease in electrical resistance. The temperature dependent material 82 is sandwiched between substrates 84 and 86 of Mylar having their contacting surfaces formed with thin layers 88 and 90 of infrared-transparent electrically conductive material. These layers of electrically conductive material are connected through an ammeter 92 to a source 94 of D-C electrical potential so that a potential gradient is imposed across the material 82. While under the D-C potential, the assembly is exposed to radiation 96 rich in infrared rays, directed onto the sheet 80 so as to penetrate through to an original document 14 containing infrared absorbtive indicia 18. The resultant thermal pattern raises the temperature of the material 82 sufficiently to lower its electrical resistance markedly, as observed by means of the ammeter 92. In this embodiment, the flow of current through the lower resistance portions of the material 92 results in an "end point" reading for the most infrared absorptive indicia 18, and thus represents a minimum exposure level.

As is well known, crystalline polymers exhibit very sharp changes in electrical resistance at near second order transition temperatures and/or melting points. Thus, the end-point temperature can be chosen by appropriate selection of the polymer and its molecular weight. Suitable polymers may be chosen from among the polyethylenes, polypropylenes and polyamides. Each unit must be callibrated with temperature before use. Thereafter, the effect is reproducible barring changes in the molecular structure of the polymeric sensor.

As required, detailed illustrative embodiments of the invention have been disclosed. However, it is to be understood that these embodiments merely exemplify the invention which may take many forms radically different from the specific illustrative embodiments disclosed. For example, the meter illustrated in FIG. 4 can be readily adapted for use with the thermochromic and heat fusible materials illustrated in FIGS. 5 and 6. Therefore, specific structural and functional details are not to be interpreted as limiting, but only as a basis for the claims which define the scope of the invention.

We claim:

1. A process for determining appropriate exposure for thermographic reproduction from a document containing information to be reproduced, said information being in the form of infrared-absorptive indicia which, upon exposure to infrared radiation, converts absorbed energy to a thermal pattern corresponding to said information, comprising:

providing a sheet of thermotropic material sensitive to a predetermined temperature to undergo a discernible and reversible modification of form;

positioning said sheet of thermotropic material adjacent said document in sufficient proximity thereto to absorb heat from said thermal pattern;

exposing said document to infrared radiation sufficient to generate said thermal pattern and effect discernible modification of said thermotropic material in correspondence to said generated thermal pattern;

determining the level of exposure causing said modification;

determining the appropriate level of a second infrared radiation exposure, for said thermographic reproduction, in view of said first mentioned level of exposure; and thermographically reproducing said information at said second level of said heat exposure.

2. The invention according to claim 1 in which said thermotropic material has electrical resistance which is sharply temperature dependent, exhibiting a marked decrease in electrical resistance at a predetermined temperature, and said first level of exposure is determined by monitoring the electrical resistance of said thermotropic material during said exposure.

3. The invention according to claim 1 in which said thermotropic material is cholesteric liquid crystalline material reflecting different wavelengths of light with change in temperature.

4. The invention according to claim 3 in which said first mentioned level of exposure is determined by exposing said cholesteric material to light and determining a change in the wavelengths of reflected portions thereof.

5. The invention according to claim 3 including the steps of predetermining said level of second infrared radiation exposure and determining a wavelength band of said reflected light corresponding to said predetermined level of second infrared radiation exposure, said first mentioned level of exposure being determined by exposing said cholesteric material to light of said wavelength band during said first mentioned exposure and determining the level of said exposure required for reflection of said wavelength band.

6. The invention according to claim 1 in which said thermotropic material comprises a thermochromic compound changing color at a predetermined temperature, and said first level of exposure is determined by measuring the time required for said color change.

7. The invention according to claim 1 in which said thermotropic material comprises opaque solid material which fuses at a predetermined temperature to a translucent form, and said first level of exposure is determined by measuring the time required for said fusion.

8. A thermal exposure meter for determining appropriate exposure for thermographic reproduction from a document containing information to be reproduced, said information being in the form of infrared-absorptive indicia which, upon exposure to infrared radiation, converts absorbed energy to a thermal pattern corresponding to said information, comprising:

- a sheet of thermotropic material sensitive to a predetermined temperature to undergo a discernible and reversible modification of form;
- means for supporting said document containing information to be reproduced;
- means for positioning said sheet of thermotropic material adjacent said document in sufficient proximity thereto to absorb heat from said thermal pattern;
- means for applying infrared radiation to said document sufficient to generate discernible modification of said thermotropic material in correspondence to said information;
- means for determining the level of exposure causing said modification;
- means for determining the appropriate level of a second infrared radiation exposure for said thermographic reproduction in view of said first mentioned level of exposure; and
- means for thermographically reproducing said information at said second level of said heat exposure.

9. The invention according to claim 8 in which said thermotropic material comprises cholesteric liquid crystalline material reflecting different wavelengths of light with change in temperature, and said radiation applying means comprises means for applying a mixture of wavelengths in the infrared and visible spectral regions.

10. The invention according to claim 8 in which said thermotropic material comprises thermochromic material changing color at a predetermined temperature, and said radiation applying means comprises means for applying a mixture of wavelengths in the infrared and visible spectral regions.

11. The invention according to claim 8 in which said thermotropic material comprises opaque solid material which fuses at a predetermined temperature to a translucent form, and said radiation applying means comprises means for applying a mixture of wavelengths in the infrared and visible spectral regions.

12. The invention according to claim 8 in which said thermotropic material comprises material having electrical resistance which is sharply temperature dependent for exhibiting a marked decrease in electrical resistance at a predetermined temperature, and said discerning means comprises means for monitoring the electrical resistance of said thermotropic material.

* * * * *